United States Patent
Sharabani et al.

(10) Patent No.: US 9,288,223 B2
(45) Date of Patent: Mar. 15, 2016

(54) POTENTIAL ATTACK DETECTION BASED ON DUMMY NETWORK TRAFFIC

(71) Applicant: SKYCURE LTD, Tel Aviv (IL)

(72) Inventors: Adi Sharabani, Ramat-Gan (IL); Yair Amit, Tel-Aviv (IL)

(73) Assignee: SKYCURE LTD, Tel Aviv (IL)

( * ) Notice: Subject to any disclaimer, the term of this patent is extended or adjusted under 35 U.S.C. 154(b) by 0 days.

(21) Appl. No.: 14/509,064

(22) Filed: Oct. 8, 2014

(65) Prior Publication Data
US 2015/0106889 A1    Apr. 16, 2015

Related U.S. Application Data

(60) Provisional application No. 61/890,278, filed on Oct. 13, 2013.

(51) Int. Cl.
*H04L 29/06*    (2006.01)
*G06F 17/30*    (2006.01)
*G06F 21/62*    (2013.01)

(52) U.S. Cl.
CPC ...... *H04L 63/1416* (2013.01); *G06F 17/30861* (2013.01); *H04L 63/08* (2013.01); *H04L 63/1491* (2013.01); *G06F 21/6263* (2013.01)

(58) Field of Classification Search
CPC .......................... H04L 63/1416; H04L 63/08
USPC .................................. 726/3, 5, 8, 24; 380/270
See application file for complete search history.

(56) References Cited

U.S. PATENT DOCUMENTS

| | | | |
|---|---|---|---|
| 2004/0172557 A1* | 9/2004 | Nakae | H04L 63/0227 726/22 |
| 2010/0325414 A1* | 12/2010 | Fries | G06F 21/6281 713/150 |

OTHER PUBLICATIONS

"Traffic Flow Confidentiality in IPsec: Protocol and Implementation"—Kiraly et al, University of Trento & University of Rome, Jun. 2012    http://www.cs.kau.se/IFIP-summerschool/summerschool2009/IFIP2007POST/papers/S07_P2_Simone_Teofili.pdf.*

* cited by examiner

*Primary Examiner* — Randy Scott
(74) *Attorney, Agent, or Firm* — The Law Office of Joseph L. Felber

(57) ABSTRACT

A method, apparatus and product for potential attack detection based on dummy network traffic. One embodiment includes a method comprising analyzing an activity, wherein the activity is performed in response to a message, wherein the message is transmitted by a first application that is executed by a computing device, wherein the computing device is connected to a computerized network, wherein the first application is configured to transmit the message in order to induce a potential attacker to perform a malicious activity, wherein said analyzing comprises comparing the activity to a predetermined expected activity in response to the message; and determining, based on the analysis of the activity, that a second application is under a potential attack; whereby an operation of the first application is capable of exposing potential attacks on the second application without monitoring network traffic of the second application.

30 Claims, 7 Drawing Sheets

(12) United States Patent

POTENTIAL ATTACK DETECTION BASED ON DUMMY NETWORK TRAFFIC

CROSS-REFERENCE TO RELATED APPLICATION

This application claims the benefit of U.S. Provisional Application No. 61/890,278 filed Oct. 13, 2013, entitled "Network Attacks Detection on Sandboxed Apps", which is hereby incorporated by reference in its entirety.

TECHNICAL FIELD

The present disclosure relates to network security, in general, and to automatic detection of a network attack, in particular.

BACKGROUND

Computerized networks and devices connected thereto are subject to attacks from malicious sources. Attacks may be from two categories: passive and active. Passive attacks are scenarios where a network intruder intercepts data traveling through the network and makes use of such data. A non-limiting list of passive attacks may include: wiretapping, data sniffing, idle scan, or the like. Active attacks are scenarios in which an intruder attempts to alter or disrupt network operation. A non-limiting list of active attaches may include cyber-attacks, Structured Query Language (SQL) injection, or the like.

Network security may refer to any activity designed to protect a network, or users of the network. Specifically, activities that protect usability, reliability, integrity, and safety of the devices that are connected to the network and data transmitted via the network. Effective network security targets a variety of threats and stops them from entering or spreading in the network.

A firewall is a network security system that controls the incoming and outgoing network traffic to a device based on applied rule set. A firewall may establish a barrier between a trusted, secure internal network and another network (e.g., the Internet) that is not assumed to be secure and trusted. Firewall applications can be installed on specific devices and monitor, in software, all communication from and to the applications that are executed on the device. By monitoring the incoming and outgoing communication and applying security related rule set, the device may be protected from some potential attacks even if the device is connected to an unsecure network. However, a firewall cannot protect from a threat of a potential attacker making use of a content of a message sent from the device in an exposed manner.

BRIEF SUMMARY

One exemplary embodiment of the disclosed subject matter is a computerized apparatus having a processor, the processor being adapted to perform the steps of: analyzing an activity, wherein the activity is performed in response to a message, wherein the message is transmitted by a first application that is executed by a computing device, wherein the computing device is connected to a computerized network, wherein the first application is configured to transmit the message in order to induce a potential attacker to perform a malicious activity, wherein said analyzing comprises comparing the activity to a predetermined expected activity in response to the message; and determining, based on the analysis of the activity, that a second application is under a potential attack; whereby an operation of the first application is capable of exposing potential attacks on the second application without monitoring network traffic of the second application.

Another exemplary embodiment of the disclosed subject matter is a method comprising: executing, by a computing device, a first application, wherein the computing device is capable of executing one or more additional applications, wherein said executing comprises: transmitting, by the first application, a dummy message via a computerized network, wherein the dummy message simulates network traffic of the one or more additional applications; receiving, by the first application, a reply message to the dummy message, wherein the reply message is received from the computerized network; and comparing the reply message with an expected reply message to the dummy message in order to identify a potential attack on the one or more additional applications.

Yet another exemplary embodiment of the disclosed subject matter is a computerized apparatus having a processor, the processor being adapted to perform the steps of: detecting an exploitation of a trackable content, wherein the trackable content is comprised in a dummy message that is transmitted by an application, wherein the application is being executed by a computing device, wherein the dummy message is transmitted via a communication channel, wherein the application is configured to transmit dummy messages in order to induce a potential attacker to exploit trackable content in the dummy messages; retrieving identifying information associated with the trackable content, wherein the identifying information comprises identification of the computing device and identification of the communication channel; and determining that messages transmitted by the computing device via the communication channel are exposed to a potential attacker.

Yet another exemplary embodiment of the disclosed subject matter is a server having a processor, the server being connected to a network, the processor being adapted to perform the steps of: receiving a message, wherein a computing device is connected to the network, wherein the computing device is executing a first application and is capable of executing one or more additional applications, wherein the first application is configured to transmit dummy messages to the server via the network, wherein the dummy messages simulate network traffic of the one or more additional applications, wherein the dummy messages comprise identifying information that identify the computing device; determining that the message is an alteration of a dummy message; extracting from the message the identifying information; and outputting a notification of a potential attack to the computing device, wherein the computing device is configured to perform a responsive action in response to the notification.

Yet another exemplary embodiment of the disclosed subject matter is a server having a processor, the server being connected to a network, the processor being adapted to perform the steps of comprising: receiving a report, wherein the report is indicative of a potential attack in a network that is detected based on a dummy message transmitted by a mobile device, wherein the dummy message is transmitted by a first application executed by the mobile device, wherein the dummy message simulates network traffic of a second application; and alerting a second mobile device that is connected to the network or is about to be connected thereto, that the network is deemed as unsafe.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
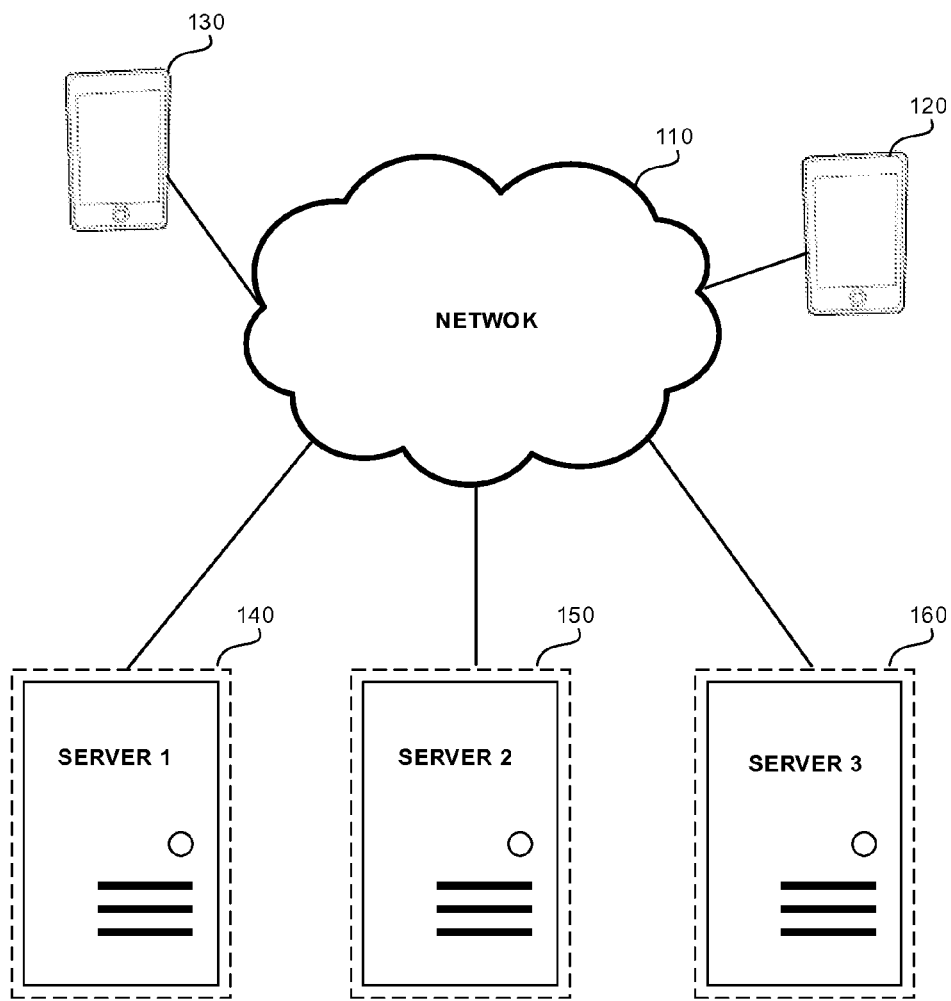
FIG. 1 shows an illustration of a computerized environment, in accordance with some exemplary embodiments of the disclosed subject matter.

One technical problem dealt with by the disclosed subject matter is to identify potential network attacks on applications executed by a computing device. In some exemplary embodiments, the computing device may be a mobile device, however the disclosed subject matter is not limited to only mobile devices. The computing device may be connected to a computerized network. The computerized network may be exposed to a variety of potential attackers. In some exemplary embodiments, the potential attackers may attempt to alter resources of the network. Additionally or alternatively the potential attackers may attempt to alter activities of the computing device or affect its operation. In other cases, the potential attackers may attempt to learn or make use of information transmitted by the computing device, but may or may not affect the computing device resources. Additionally or alternatively, the potential attackers may attempt to attack applications executed by the computing device, such as but not limited to Secure Sockets Layer (SSL) stripping, SSL decryption, Hyper Text Transfer Protocol (HTTP) cache poisoning, Domain Name System (DNS) spoofing, or the like.

In some exemplary embodiments, the computing device may be operated by an operating system that implements a sandbox approach, also referred to as a sandbox operating system. The sandbox approach may be implemented by executing software of the computing device in a restricted operating system environment, thus controlling resources that a process of the software may use, such as file descriptors, memory, file system space, network traffic, or the like. Additionally or alternatively, sandbox may be a security mechanism for separating executed applications of the computing device. In some exemplary embodiments, the sandbox operating system may be, for example, iOS™, Android™, or the like. By implementing the sandbox approach, the operating system may provide a protection layer to the computing device and applications executed by the computing device from potential malicious applications that may be installed. However, the sandbox approach may limit the capabilities of firewall applications or other security client-side applications that may be executed by the operating system. In some cases, the sandbox operating system may limit the possibility of one application being executed by the sandbox operating system to monitor traffic to and from other applications that are being executed in separate sandboxes. Due to this limitation, a firewall application cannot be implemented in sandbox operating systems, as opposed to non-sandbox operating system, leaving such devices more exposed to potential threats.

Another technical problem dealt with by the disclosed subject matter is to detect potential malicious activity with respect to messages of a target application without monitoring the messages issued and received by the target application. The malicious activity may be activity which interacts with the target application or an activity which exploits a vulnerability of the target application without interacting with the application, such as reviewing unencrypted content transmitted by the target application.

One technical solution may be to utilize an application which is executed by the computing device, to detect a potential attack on the computing device and potentially on other applications being executed by the computing device. In some exemplary embodiments, the computing device may execute one or more additional applications. The one or more additional applications may be executed in separate sandboxes, whereby the application is incapable of monitoring traffic to and from the one or more additional applications.

The application may repeatedly transmit a dummy message via the computerized network. The dummy message may simulate network traffic of the one or more additional applications. It will be noted that the application may or may not be aware whether the one or more additional applications are actually installed on the computing device or executed by the computing device. As an example, the one or more additional applications may be a browser application which may be commonly used by computing devices but not necessarily executed by the computing device at the time the application simulates typical network traffic of a browser application.

In some exemplary embodiments, a potential attacker may attempt to provide a response to the dummy message in order to attack the computing device. It will be noted that attacker on the network may rely on the network traffic generated by victim devices in order to decide when and how to attack their apps. By creating dummy communication that looks exactly like, or substantially similar to, real communication of other apps, the attacker is mislead to believe that the communication represents the app that the attacker wants to attack. The attacker may not be able to distinguish between real traffic of applications that the attacker wants to attack and the simulated network traffic consisting of dummy messages. In some cases, both traffic types may be transmitted concurrently by the computing device, however in other cases, only the simulated traffic may be transmitted. A reply message to the dummy message may be received by the first application. The reply message may be received from the computerized network. The reply message may be compared with an expected reply message to the dummy message in order to identify a potential attack on the one or more additional applications. It will be noted that if a potential attacker attacks the device by providing a malicious response to the dummy message, the potential attacker is likely to similarly provide a similar malicious response to non-dummy messages issued by the one or more additional applications. Therefore, an attack on the application (e.g., a malicious response to the dummy message) may be an indication that applications that issue messages similar to the dummy message are also under potential attack.

Another technical solution may be to detect an exploitation of a trackable content that was comprised in a dummy message, which was transmitted by an application via a communication channel The application may be configured to transmit dummy messages in order to induce a potential attacker to exploit trackable content in the dummy messages. Once an exploitation of the trackable content is detected, the identifying information associated with the trackable content may be retrieved, such as from the exploited usage of the trackable content. The identifying information may comprise identification of the computing device and identification of the communication channel. Messages transmitted by the computing device via the communication channel may be determined to be exposed to a potential attack. As a result, other applications that are executed on the computing device which transmit messages that are similar to the dummy message via the communication channel may also be potentially exposed to the potential attack.

In some exemplary embodiments, the detection of the exploitation of the trackable content may be performed by a server different than the computing device. The server may be a target of the exploitation of the trackable content. As an example, the server may mimic an email server and the trackable content may be login information to the email server. In such an embodiment, the server may detect login that is not performed as part of a dummy message, such as a login access that is followed by a retrieval request, or otherwise not consistent with the actions that are performed by the dummy message. Additionally or alternatively, the server may periodically access a third-party server that is the target of the exploitation of the trackable content. As an example, the target of the dummy message may be a third party social network service. The trackable content may be login information for a dummy user in the third party social network service. The server may actively check with the third party social network service for login attempts in order to detect the exploitation. As another example, the configuration of the third party social network service may be designed so as to provide a notification to the server upon a login to the dummy user or upon using the dummy user in a manner not consistent with a usage by a dummy message.

Yet another technical solution may be to provide a server that is a target of dummy messages and which is configured to detect an altered dummy message which is indicative of a potential attack. The computing device may be executing an application which is configured to transmit dummy messages to the server via the network. The dummy messages may comprise identifying information that identify the computing device and/or the computerized network to which the computing device is connected. In some exemplary embodiments, the server may receive a message and determine that the message is an alternation of a dummy message. In such a case, the server may extract the identifying information from the message, and output a notification of a potential attack to the computing device. The computing device may be configured to perform a responsive action in response to the notification.

Yet another technical solution may be to establish an unsafe network database. The unsafe network database may be established based on the detection of potential attacks in a network. In some cases, a network may be deemed unsafe if it is detected as being under attack once, if it repeatedly detected as being under attack, or the like. In some cases, the unsafe network database may be provided for real-time purposes, so as to indicate which network is currently being under attack. The disclosed subject matter may enable notifying computing devices connected to the network that it is a potential source of an attack at the present time. The unsafe indication may be removed after a predetermined time if no additional potential attack is detected in the network. In some cases, the unsafe network database may be provided for non-real time purposes. As an example, a Wi-Fi network in an airport may be repeatedly identified as being under attack. The unsafe network database may accordingly indicate that Wi-Fi network as being unsafe in order to indicate that when connecting to this network, the computing device may be exposed to an attack. In some exemplary embodiments, a device may utilize the unsafe network database in order to determine whether the network to which the device is connected (or about to be connected) is a known potential security hazard or not.

In some exemplary embodiments, a computing device may be used as a sensor that is useful for detecting unsafe networks. The computing device may simulate network traffic associated with apps, even if such apps are not executed by the computing device. Such traffic may be useful for identifying an attacker on the network. This information may be useful for setting an higher risk-score to the network, thus allowing a proactive protection for current and future users of the network. Such score may be retained in the unsafe network database.

In some exemplary embodiments, the unsafe network database may retain information regarding which potential attacks were detected in the unsafe network. In some cases, some types of potential attacks may be relevant for some applications and not for others. As an example, an attack which is based on a specific communication protocol may only be relevant to applications that make use of the specific communication protocol. As another example, an attack may be targeted for a specific software, such as utilizing a known security vulnerabilities of a specific application, operating system version, or the like. The unsafe network database may be used in fine grain mode in order to notify only devices which may be exposed to the detected types of potential attacks.

One technical effect of the disclosed subject matter may be to provide a protection to applications executed by a mobile device in a sandbox operating system. The disclosed subject matter may provide detection of potential attacks and protection capabilities to protected applications on the computing device, without having access to the protected applications, and potentially without knowing the activity of the protected applications. The application that is used to detect an attack may mimic the traffic of the protected applications and thereby detect potential attack on the protected application although being incapable of monitoring the actual traffic of the protected application.

Another technical effect may be to provide a protection to other computing devices connected to the network, based on detecting a potential attack on a single computing device that is connected to the network. The disclosed subject matter may provide for a crowd-sourced security mechanism in which some computing devices are used to detect potential attacks in computerized networks, and other devices make use of the information gathered from those computing devices. As a result, one or more devices may be used to protect another device that is connected to the same network at the same time or at different times.

Yet another technical effect may be to generate network traffic that simulates actual network traffic. A potential attacker that is exposed to the generated network traffic may not be able to distinguish between the generated network traffic, which is associated with dummy messages that serve no actual purpose at the target destination, and between actual network traffic, which the potential attacker would like to exploit.

Yet another technical effect may be to provide a security mechanism for a computing device which provides for an active protection by utilizing network bandwidth. Using a crowd-sourced security mechanism a lean security mechanism may be provided for a computing device which does not generate network traffic by the computing device itself and therefore does not utilize network bandwidth of the computing device. In some exemplary embodiments, a same application may be configured to provide either the lean security mechanism or the non-lean mechanism depending on a status of the computing device, such as battery level, network pricing, available network bandwidth, or the like.

Referring now to FIG. 1 showing an illustration of a computerized environment, in accordance with some exemplary embodiments of the disclosed subject matter.

In some exemplary embodiments, a Network 110 may be configured to enable computing devices to exchange data. In some exemplary embodiments, Network 110 may be a computerized network enabling devices connected thereto (directly or indirectly) to communicate with one another. In some cases, Network 110 may be comprised of various local networks connected to one another, such as Local Area Networks (LANs), Wide Area Networks (WANs), Wi-Fi networks, 3G Cellular network, 4G Cellular network, or the like. In some exemplary embodiments, a local network may be a network to which a device is directly connected, such as a Wi-Fi network, a 3G network, a LAN, or the like. In some cases, different devices that are connected to different local networks may communicate with each other over Network 110. In some exemplary embodiments, Network 110 may be an intranet, the Internet, or the like. In some exemplary embodiments, nodes of Network 110 may be connected in a wired or wireless manner. The network nodes may be computing devices that originate, route and terminate the data in the network, such as personal computers, phones, servers, networking hardware, or the like. In some exemplary embodiments, Network 110 may be configured to allow the network nodes to exchange information, whether or not the network nodes have a direct connection to each other.

In some exemplary embodiments, a Device 120 may be connected to Network 110. Device 120 may be a computing device such as a computer, a laptop, a mobile device, a smart phone, a Personal Digital Assistant (PDA), or the like.

In some exemplary embodiments, Device 120 may be configured to execute applications. The applications may be executed in separate sandboxes limiting or prohibiting access of one application to resources of the other applications. In some exemplary embodiments, Device 120 may execute a detection application that is configured to detect potential attacks on the applications executed by Device 120. The detection application may simulate network traffic of other applications susceptible to potential attacks, such as the other applications that are being executed by Device 120 or which are installed on Device 120. The simulated network traffic may be generated without monitoring network traffic of the other applications installed on or executed by Device 120, as such monitoring may be prohibited by the sandboxed operating system of Device 120.

In some exemplary embodiments, as part of the simulated network traffic, the detection application may be configured to generate requests. The requests may be aimed at a Server 140 that is connected to Network 110.

In some cases, Server 140 may be a dedicated server that is aware of the dummy network traffic generated by the detection application. In some exemplary embodiments, Server 140 may detect traffic that utilizes information that was exposed by dummy messages transmitted by the detection application and may determine that such traffic is not part of the dummy messages. Such detection may be useful to detect a potential attack on Device 120 and communication originating therefrom. In response to such detection, Device 120 may be notified of the potential attack in order to induce a responsive action that may prevent the attack or reduce the risk.

Additionally or alternatively, Server 140 may be a third party server that is not aware of the detection application and its generated network traffic. Once content of a dummy message is exploited by a third party in a manner not consistent with the dummy messages, Server 140 may generate an alert. As an example, a script may be executed in response to accessing Server 140 with some credentials that are contained by dummy messages. Alternatively, Server 160 may periodically access Server 140 to determine whether such content was exploited. As an example, Server 160 may check for previous login attempts made to Server 140 with specific credentials.

In some exemplary embodiments, detection application in Device 120 may examine responses received to transmitted dummy messages and detect potential attacks based on the responses. A response issued by Server 140 may be modified as part of an attack on Device 120. Device 120 may compare the response with an expected response to determine whether Device 120 is under a potential attack.

In some exemplary embodiments, Server 150 may be configured to update rules utilized by applications of Device 120. Server 150 may be configured to update applications of Device 120 with security logic. The security logic may comprise information about dummy requests that may be sent by the detection application. Additionally or alternatively, the security logic may comprise verification logic that is useful for testing responses for changes that can suggest an existence of a possible attacker to Device 120 or Network 110. As an example, the rules may comprise parameterized dummy messages, corresponding parameterized responses, or the like. In some cases, the responses may be web pages that are retained by Server 140, such as web pages that are returned by Server 140 in response to an HTTP retrieval request.

In some exemplary embodiments, a Server 160 may be configured to receive data from plurality of instances of detection applications executed by Device 120 and other devices. Server 160 may register the potential attack in an unsafe network database. Server 160 may be utilized by other devices, such as Device 130, to detect whether the other devices are potentially under attack based on the detection which relied on the dummy messages transmitted by Device 120. In addition, upon a detection of an attacker in Network 110, Server 160 may push a notification to other devices connected to the same local network as Device 120, such as for example, Device 130.

In some exemplary embodiments, Server 160 may aggregate data received from the plurality of instances of applications executed by Device 120, to crowd-source for information relating to security threats in certain networks, at certain times, or the like.

In some exemplary embodiments, Sever 140, Server 150, Server 160, or portion thereof may be implemented together.

Figure 2:
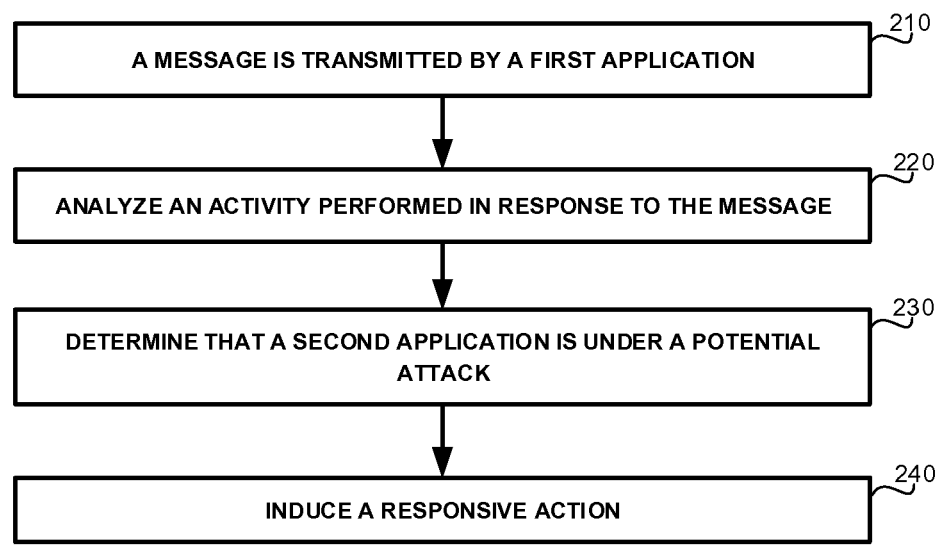
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

In Step 210, a message may be transmitted by a first application. The first application may be a detection application executed by a computing device, such as a computer, a mobile device, or the like. The computing device may be connected to a computerized network, such as a public Wi-Fi network, an Ethernet LAN, or the like. In some exemplary embodiments, the first application may be configured to transmit the message in order to induce a potential attacker to exploit a content of the message. It will be noted that the transmitted message may be a dummy message which is generated not in order to communicate between the computing device and a remote server, but rather transmitted in order to induce a potential attack to exploit such message to attack the computing device.

In some exemplary embodiments, the computing device may execute at least a second application. The computing device may execute the first and the second application in separate sandboxed environments. In such a case, each application cannot monitor network traffic of other applications on the computing device. In some exemplary embodiments, the message transmitted by the first application may simulate network traffic of the second application.

In Step 220, an activity that is performed in response to the message may be analyzed. In one case, the activity may comprise a reply message that is transmitted in response to the message. A content of the reply message may be indicative to the potential attack. In another cases, the activity may be an exploitation of a trackable content that is comprised by the message sent in Step 210. The trackable content may comprise identifying information which identify the computing device and/or the computerized network that is used to transmit the message.

In some exemplary embodiments, the activity may be compared to a predetermined expected activity in response to the message. In case the activity comprises a reply message, the reply message may be compared with an expected reply message to the message. The reply message may be analyzed to determine whether the reply message is transmitted by a potential attacker who has been revealed to the message. As an example, the reply message may be a modified web page in comparison to the expected web page, in which HTTPS links are replaced by non-secured HTTP links. In case the activity comprises an exploitation of the trackable content, the activity may be analyzed to determine whether the activity comprises an exploitation of the trackable content, such as for example using a cookie file that is transmitted with the message in another non-dummy message, such as, for example, sending the cookie file to a check-out page in which the credentials retained in the cookie are utilized in order to charge for a purchase made in a website.

In Step 230, the second application may be determined to be under a potential attack. The determination may be based on the analysis of the activity. In some exemplary embodiments, the content of the reply message may be indicative of a potential attack. Additionally or alternatively, the exploitation of the trackable content may be indicative of a potential attacker exploiting the content of the message. In some exemplary embodiments, the identifying information may be retrieved. The computerized device that is under the potential attack may be identified based on the identifying information. Additionally or alternatively, information regarding the potential attack may be determined, such as a type of the potential attack (e.g., SSL Stripping, SSL decryption, DNS spoofing, or the like).

In Step 240, a responsive action may be induced in response to the determination that the second application is under the potential attack. In some exemplary embodiments, the responsive action may comprise notifying a user of the computing device of the potential attack. Additionally or alternatively, the responsive action may comprise applying a protection mechanism on applications executed by the computing device. The protection mechanism may be configured to protect the one or more additional applications from potential attacks that are similar to the potential attack, such as, for example, depicted in US 2013/0,340,031 entitled "Access control system for a mobile device" and in US 2013/0,339, 724 "Selective encryption in mobile devices", which are both hereby incorporated by reference in their entirety. Additionally or alternatively, the protection mechanism may be configured to protect at least one of the one or more additional applications from potential attacks that are similar to the potential attack. In some exemplary embodiments, the responsive action may comprise opening a Virtual Private Network (VPN) connection. The VPN connection may block potential attacks before reaching the one or more additional applications. In some exemplary embodiments, the responsive action may comprise outputting a notification to an Information Technology (IT) department of an organization associated with the computing device. In some exemplary embodiments, the responsive action may be to change credentials to services which may be exposed in view of the potential attack. Credentials change and other modification activities may be performed automatically, semi-automatically or manually, and may be performed only with respect to services which are deemed as sensitive.

Figure 3:
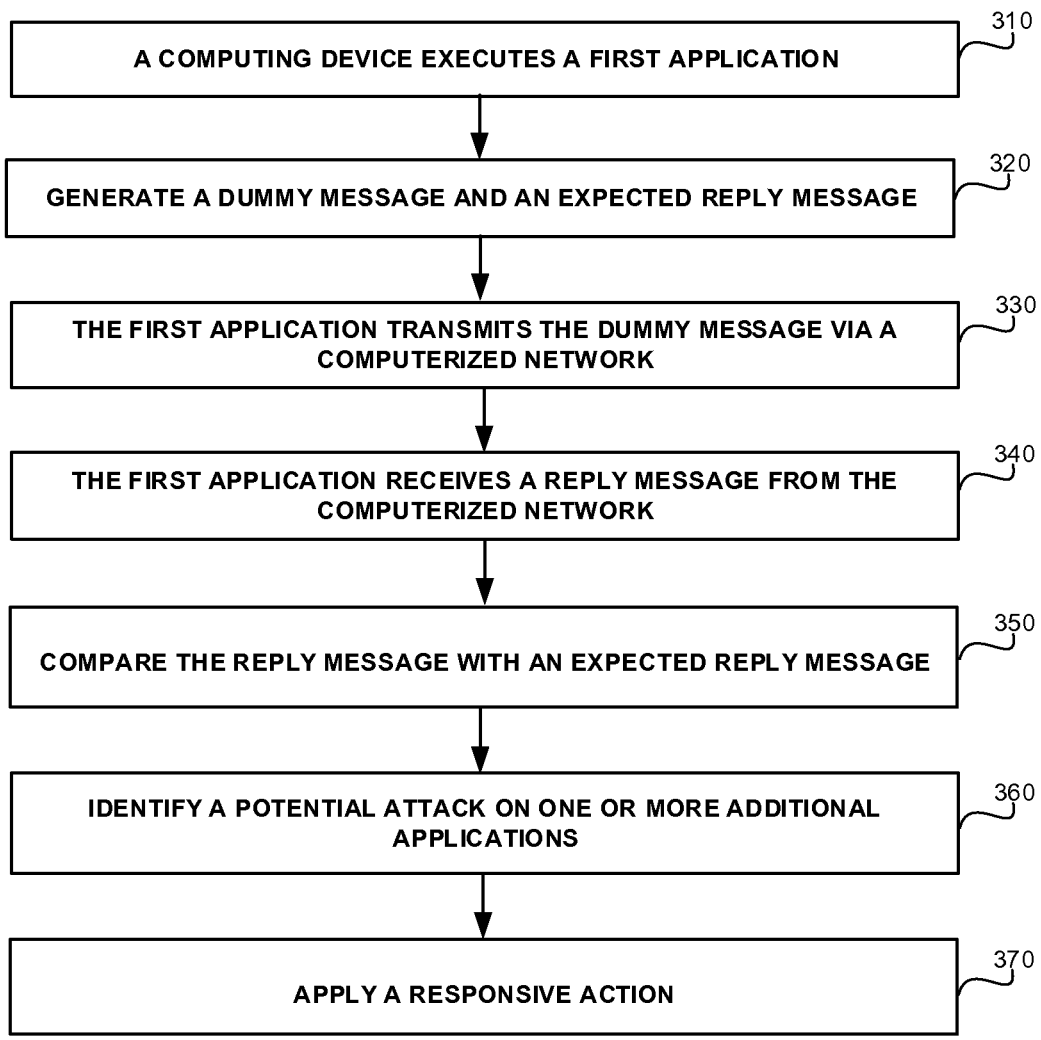
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

In Step 310, a computing device may execute a first application. The computing device may execute one or more additional applications. In some exemplary embodiments, the computing device may be a mobile computing device. In some exemplary embodiments, the first application and the one or more additional applications may be executed in separate sandboxes, whereby the first application is incapable of monitoring traffic to and from the one or more additional applications.

In some exemplary embodiments, the computing device may be connected to a computerized network. The computerized may be a data network, a telecommunications network, or the like.

In Step 320, a dummy message and an expected reply message may be generated. The dummy message and the expected reply message may be generated based on information retained in a local repository of the computing device. The dummy messages retained may be concrete messages or parameterized messages, i.e. messages that are defined by parameters. The parameters may be substituted to generate concrete dummy messages, such as the dummy message transmitted by the application. A parameterized reply message may be obtained and be used for comparing a reply message to the concrete dummy message, as is explained below. In some exemplary embodiments, the expected reply message may be parameterized or non-parameterized. In some cases, some of the parameters of the expected reply message may correspond to parameters of the parameterized dummy message, and the value of the parameters of the concrete dummy message may be used to concretize those parameters. Some parameters may remain in their parameter form to be used for comparing the actual reply with the expected reply. As an example, the reply message may be a web page. The expected reply message may include parameters to be used to define a template of the expected reply. One parameter may be a name of the user, which may correspond to the parameter provided in the dummy message and may be concretize by the same value (e.g., same user name). Another parameter may provide a template of an expected dynamic area in the web page, whose content may change from time to time. As an example, such dynamic areas may be timestamps, ad placeholders, dynamically obtained RSS-based content objects, or the like. In some exemplary embodiments, regular expressions may be used to define the content of the expected dynamic areas. However, the disclosed subject matter is not limited to such an implementation and any other template definition may be used instead of or in addition to regular expressions.

As one example, the retained dummy message may be a message that relates to a Secure Sockets Layer (SSL) handshake. The SSL handshake may be used as part of an authentication protocol, such as using symmetric keys for encryption, decryption, and tamper detection during the SSL session that follows. A corresponding reply message may be an encrypted expected reply message with a valid certificate that represents the owner of the server to which the request was sent. Receiving a different response may be indicative that the reply message was tampered with. As another example, the dummy message may be a Domain Name System (DNS) request. The DNS request may comprise a specified DNS domain name, a specified query type, which can either specify a resource record by type or a specialized type of query operation, and a specified class for the DNS domain name. A corresponding reply message may be the expected DNS record. Receiving a different response may be indicative of a DNS related attack in the network. As yet another example, the dummy message may be a retrieval request of a World Wide Web (WWW) web page. The corresponding expected response may be the expected retrieved web page which may be retained locally on the computing device. Receiving a different web page may be indicative of an attack in the network.

In some cases, the dummy messages may be messages that are typical to some applications, such as web browsers, specifically target applications, or the like. In some cases, the dummy messages may simulate specific known vulnerability of a predetermined application. The generated dummy message may be a dummy message that is related to a second application installed on or executed by the computerized device. Additionally or alternatively, the dummy message may not relate to any application installed on the computing device but rather to applications that are potentially installed on or executed by other computerized devices that are connected to the computerized network.

In Step 330, the first application may transmit the dummy message via the computerized network. In some exemplary embodiments, the dummy message may simulate network traffic of the one or more additional applications or of other applications which may or may not be executed/installed on the computerized device. In some exemplary embodiments, the dummy message may be characterized in at least one of the following characteristics: the dummy message may be configured to utilize a protocol that is used by at least one of the one or more additional applications (e.g., a Simple Object Access protocol (SOAP), a Hypertext Transfer Protocol (HTTP), a Simple Mail Transfer Protocol (SMTP), SSL, DNS, or the like), the dummy message may be configured to access a remote resource that is accessed by at least one of the one or more additional applications (e.g., a specific server, a specific URL, or the like), or the dummy message may comprise a user agent identification of at least one of the one or more additional applications. It will be noted, that a user agent identification may be a field in a message that is indicative of an application transmitting the message. The content of such field may be used to mimic network traffic of other applications.

In Step 340, the first application may receive a reply message to the dummy message. The reply message may be received from the computerized network. The reply message may be received in response to the dummy message.

In Step 350, the reply message may be compared with the expected reply message in order to identify a potential attack on the one or more additional applications. As one example, a certificate list returned in the reply message may be compared with an expected certificate list. As another example, when the reply message comprises a web page, the web page may be compared with an expected web page which corresponds to the dummy message according to the local repository. As explained hereinabove, the comparison may be between the actual reply message and a parameterized expected reply message, which may define dynamic areas whose content may not be a-priori known though the structure thereof may be a-priori known.

In step 360, a potential attack on the one or more additional applications may be identified. The potential attack may be any attempt to destroy, expose, alter, disable, steal or gain unauthorized access to or make unauthorized use of an asset of the computing device. The potential attack may be a password-based attack, a denial-of-service attack, a man-in-the-middle attack, a compromised-key attack, a sniffer attack, an application-layer attack, or the like. As an example, a man-in-the-middle attack may occur when a potential attacker between the computing device and a destination with whom the computing device is communicating is actively monitoring, capturing, and controlling the communication transparently. For example, the attacker can re-route a data exchange. When the computing device is communicating at low levels of the network layer, the computing device may not be able to determine with whom it is exchanging data.

In Step 370, a responsive action may be applied in response to the identified potential attack. The responsive action taken in Step 370 may be similar to that of Step 240.

Figure 4:
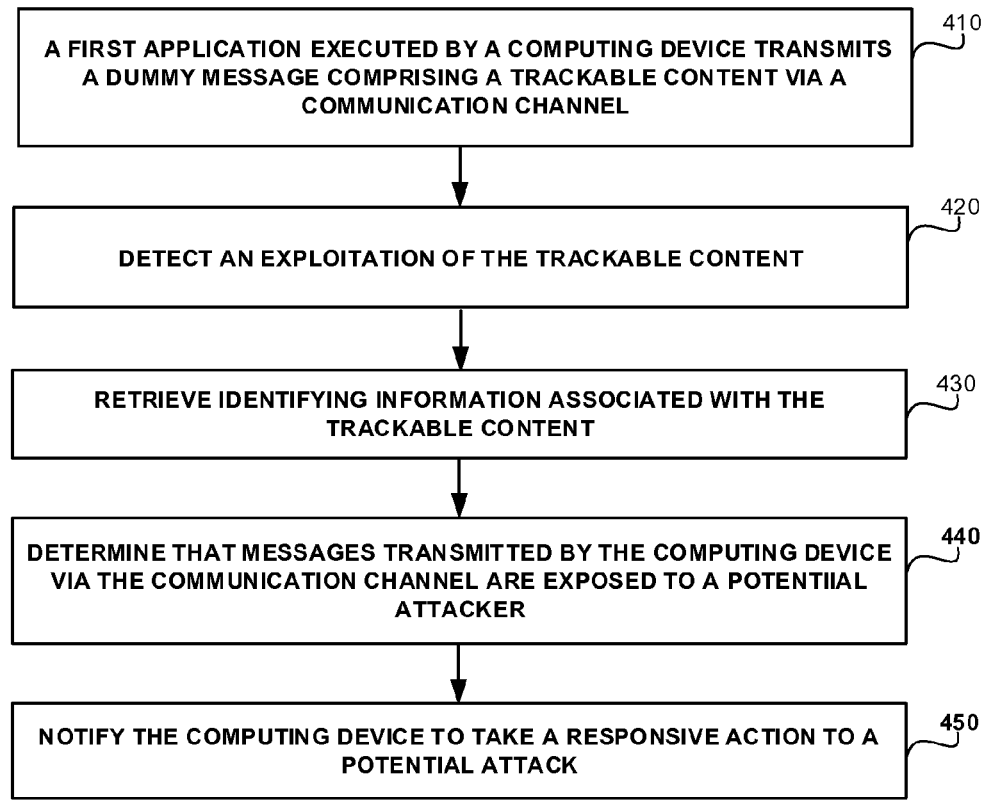
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

In Step 410, a dummy message may be transmitted by an application. The application may be executed by a computing device. The dummy message may be transmitted via a communication channel, such as for example, a Wi-Fi network, a LAN, a cable to a local network, 3G network, or the like. The application may be configured to transmit dummy messages in order to induce a potential attacker to exploit trackable content in the dummy messages.

In some exemplary embodiments, the dummy message may comprise a trackable content. The trackable content may be associated with identifying information that may be retrieved from the trackable content or using the trackable content. The identifying information may include, for example, an identifier of the instance of the application that transmitted the dummy message, an identifier of the computing device that transmitted the dummy message, an identifier of the communication channel used to transmit the dummy message, a timestamp indicating a time in which the dummy message was transmitted, a combination thereof, or the like. In some exemplary embodiments, the identifying information may be encoded in the trackable content and therefore when the trackable content is exploited, the identifying information may be decoded from the trackable content. Additionally or alternatively, an exploitation of the trackable content may induce a software component which retains the identifying information, such as a script which is executed upon logging in using specific credentials.

In some exemplary embodiments, the trackable content may be login credentials. The login credentials may be uniquely associated with the application instance that transmitted the dummy message. In some exemplary embodiments, the login credentials may be created for a dedicated dummy server which is dedicated for the purposes of the disclosed subject matter. The login credentials may be credentials required to obtain access to a computer system or other restricted area. In some exemplary embodiments, the login credentials may be login credentials to a managed system which may comprise a user identifier and a password. The login credentials may comprise a Public key infrastructure (PM) certificate, tokens, biometrics, a set of personal questions that a user must answer, or the like. Additionally or alternatively, the login credentials may comprise identity data of personal information, legal information, or the like.

As an example, a dedicated dummy server may be an email server which may appear to potential attackers as potentially containing emails of users. In such a case, the trackable content may be login credentials to the dedicated dummy server which comprise user name and password. In some cases, the identifying information may be encoded in the user name, in the password, or the like. It will be appreciated that encoding the identifying information in the password may generate a set of characters that may appear as a valid password to an observer.

As another example, a third party server may be used, such as a server of a social network service. The disclosed subject matter may create a dedicated user in the third party server which may uniquely be associated with the identifying information. The dedicated user may be configured to push a notification upon a login, such as using scripts or apps of the social network service. The pushed notification may include the identifying information and may be indicative of an exploitation of the trackable content.

Additionally or alternatively, the trackable content may comprise a web cookie. In some exemplary embodiments, the web cookie may be a small piece of data sent from a website and stored in a user's web browser while the user is browsing that website. In some exemplary embodiments, web cookies may be HTML cookies. When the user loads the website, the browser may send the web cookie back to the server to notify the website of the user's previous activity. In some exemplary embodiments, the web cookie may perform essential functions, such as authentication whether a user is logged in or not, and which account they are logged in with. Additionally or alternatively, the web cookie may comprise a URL of a website that created the cookie, duration of the cookie's abilities and effects, a random number, or the like. The identifying information may be encoded within the web cookie, such as using defunct fields, using comment fields, using non-mandatory fields, using identifier fields, or the like.

In Step 420, an exploitation of the trackable content may be detected. In some exemplary embodiments, the exploitation may comprise performing a log in using the login credentials. Additionally or alternatively, one or more messages which comprise the web cookie may be received. The one or more messages may be determined not to be dummy messages, based on the received web cookies. As an example, a dummy message may include a web cookie that is transmitted in an initial state. An updated dummy cookie may be returned in response to the dummy message. However, in the simulated traffic, the updated web cookie may not be used, but rather the original web cookie may be used again by additional future dummy messages. In such an embodiment, receiving an updated cookie back from the client may be indicative of a potential attack. Such an update may be consistent, for example, with adding an item to a shopping cart module, which an attacker may perform.

In some exemplary embodiments, the dummy messages may be configured to perform one or more alternative activities which exploit the trackable content. An activity that exploits the trackable content that is different than the one or more alternative activities may be detected. Referring again to the example of the email server, the dummy messages may be configured to perform a login activity using an email protocol (e.g., Post Office Protocol 3 (POPS), Internet Message Access Protocol (IMAP), or the like) but not to request to download emails from the server. The dedicated dummy server may detect an exploitation of the trackable content when a logged user attempts to download the emails. Referring again to the example of the third party social network service, the dummy messages may include only a login request without a request to download images in the logged-in web page. Upon a potential attacker logging in to the dummy user, the browser of the potential attacker may render a received web page after the login. During such rendering, images may be retrieved which may detectable to a server in accordance with the disclosed subject matter. Additionally or alternatively, an application or script may be executed by the browser of the potential attacker and may issue a push notification in accordance with the disclosed subject matter.

In Step 430, identifying information associated with the trackable content may be retrieved. In some exemplary embodiments, the identifying information may be encoded in the trackable content and extracted upon a detection of exploitation thereof.

Additionally or alternatively, the identifying information may be retained and used upon a detected exploitation. For example, a user may be defined for a specific instance of identifying information. Upon a detection of an exploitation of the trackable content, there may be no need to extract the identifying information from the trackable content, which may be independently retained with respect to the defined user.

In Step 440, messages transmitted by the computing device via the communication channel may be determined to be exposed to a potential attacker. The determination may be based on the detection of Step 420 and the identifying information of Step 430, which may be indicative of a potential attack. In some cases, a specific form of potential attack may be determined Additionally or alternatively, a protocol under attack may be determined, such as may be the case that IMAP messages are intercepted by a potential attacker and not HTTP requests.

In Step 450, the computing device may be notified to take a responsive action to a potential attack, such as in Step 240 of FIG. 2. In some exemplary embodiments, in response to detecting that the exploitation of the trackable content is performed within a predetermined time range from the transmission of the dummy message, the computing device may be notified to take the responsive action to the potential attack. The predetermined time range may be, for example, few minutes, few seconds, or the like. Additionally or alternatively, the responsive action may be performed only if the computing device is still connected to the communication channel and is deemed as still exposed to the potential attack. In some exemplary embodiments, some responsive actions, such as flagging a network as dangerous for the sake of other devices or changing credentials to services may be performed although the computing device is no longer connected to the communication channel.

In some exemplary embodiments, the notification may be transmitted to other computing devices that are connected to the communication channel and which may also be exposed. Additionally or alternatively, the notification may be transmitted, directly or indirectly, only to devices which have installed thereon or are currently executing, applications which are exposed to the potential attack (e.g., the potential attack is an exploitation of a known vulnerability of the applications, the applications utilize the protocol being under attack, or the like).

Figure 5:
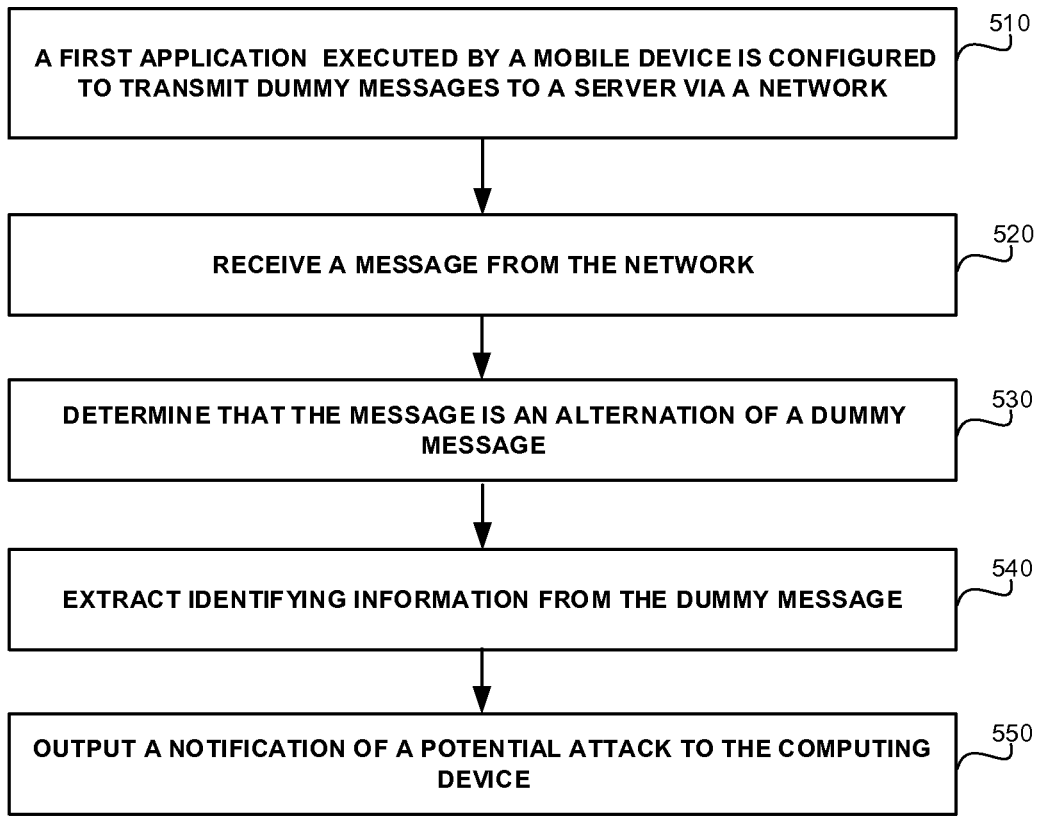
FIG. 5 shows a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

In Step 510, a first application, which is executed by a computing device that is connected to a local network, may transmit dummy messages to a server via the network. In some exemplary embodiments, the computing device may execute one or more additional applications. The dummy messages transmitted by the first application may simulate network traffic of the one or more additional applications or of other actual or contemplated applications. Additionally or alternatively, the dummy messages may comprise identifying information.

In Step 520, the server may receive a message from a network, such as the Internet.

In Step 530, the message may be determined to be an alteration of a dummy message. In some cases, the server may have predetermined knowledge concerning the dummy messages, such as their content, the expected activity, the Internet Protocol (IP) address from which they are transmitted, or the like. The server may compare the received message with the expected dummy messages to determine whether the message is a dummy message or an alteration of a dummy message. An alteration of a dummy message may be indicative of a potential attacker intercepting the dummy message and transmitting an alteration thereof to the server.

In Step 540, the identifying information may be extracted from the message. Based on the identifying information it may be determined which computing device is under a potential attack, at what approximated time the attack took place, which local network is under the potential attack, or the like In Step 550, a notification of a potential attack may be outputted to the computing device. The computing device may be configured to perform a responsive action in response to the notification, such as blocking potential attacks or the like.

Figure 6A:
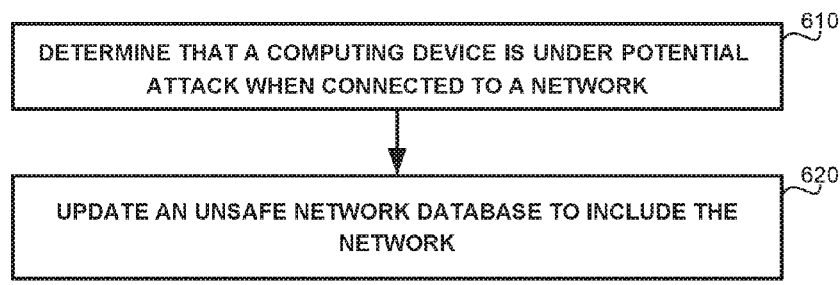
FIGS. 6A and 6B show flowcharts diagrams of methods, in accordance with some exemplary embodiments of the disclosed subject matter.

Referring now to FIG. 6A showing a flowchart diagram of a method, in accordance with some exemplary embodiments of the disclosed subject matter.

In Step 610, a computing device may be determined to be under a potential attack. The determination may be based on any of the methods illustrated in FIGS. 2-5 or similar methods in accordance with the disclosed subject matter. In some cases, the type of potential attack, estimated time of attack, or the like may also be determined In Step 620, an unsafe network database may be updated to include the network in which the attack was detected. In some exemplary embodiments, the unsafe network database may be retained by a remote server, such as Server 160 of FIG. 1. The unsafe network database may be established based on detection of potential attacks in a network in various devices over time. The unsafe network database may retain networks that were determined to be unsafe. A network may be considered to be unsafe if it was detected to be under attack once, if it has repeatedly detected to be under attack, if it has detected to be under attack by several computing devices, or the like. In some exemplary embodiments, the unsafe network database may retain networks that are determined to be unsafe in real-time, i.e. networks that were detected to be under a potential attack within a predetermined time range, such as few seconds, few minutes, few hours, or the like. In such cases, the unsafe network database may be utilized to indicate networks that are currently being under attack. Networks that no additional potential attack were detected in them, may be removed from the real-time unsafe network database after a predetermined time, such as few minutes, few hours or the like. Additionally or alternatively, the unsafe network database may retain networks that has been repeatedly determined to be unsafe, or networks that has been determined to be unsafe for an extended period of time, such as hours, days, months, or the like. In some cases, networks may be determined to be unsafe based on the total time of being under a potential attack as a portion of a total connection time between a detection computing device and the network. In some exemplary embodiments, detection applications may notify the unsafe network database of dummy messages transmitted in each network. The unsafe network database may aggregate the received information from different devices and compute a percentage of dummy messages that were a target of a potential attack in the network out of the dummy messages transmitted in the network. In case the percentage is above a threshold, such as 0.5%, 1%, 5% or the like, the network may be deemed as an unsafe network. In some cases, the above calculation may be performed for a sliding window of a predetermined time range, such as the last month, the last year, or the like. In some cases, the above calculations may be performed separately for different kinds of dummy messages, such as dummy messages utilizing different protocols or being configured to be subject to different attacks.

In some exemplary embodiments, the unsafe network database may retain information regarding types of the potential attacks that were detected in the unsafe networks. In some cases, some types of potential attacks may be relevant for some computing devices and not for others. As an example, an attack which is based on a specific communication protocol may only be relevant to computing devices that execute applications that make use of the specific communication protocol. As another example, a specific application may have a known vulnerability. An attack of such known vulnerability may be induced by having a dummy message mimic the messages of the specific application. Detecting an attack which is based on such vulnerability may be relevant only to devices which have installed thereon the specific application.

In some exemplary embodiments, big data analysis may be utilized to analyze notifications received from different sources, such as servers and computing devices. In some cases, the notifications may indicate detection of potential attacks, dummy messages transmitted which were not subject to an attack, or the like. The big data analysis may determine whether a network is unsafe based on the notifications. A network may be determined to be unsafe based on the amount or percentage of potential attacks detected on the network, the number of times computing devices that had been used to check the network for potential attacks, or the like. The big data analysis may determine the type of the potential attack, which communication channel of the network is exposed to the potential attack, or the like. Optionally, such analysis of dummy messages and their respective outcomes may be used to automatically detect trends of attackers, new attack scenarios, or the like.

Figure 6B:
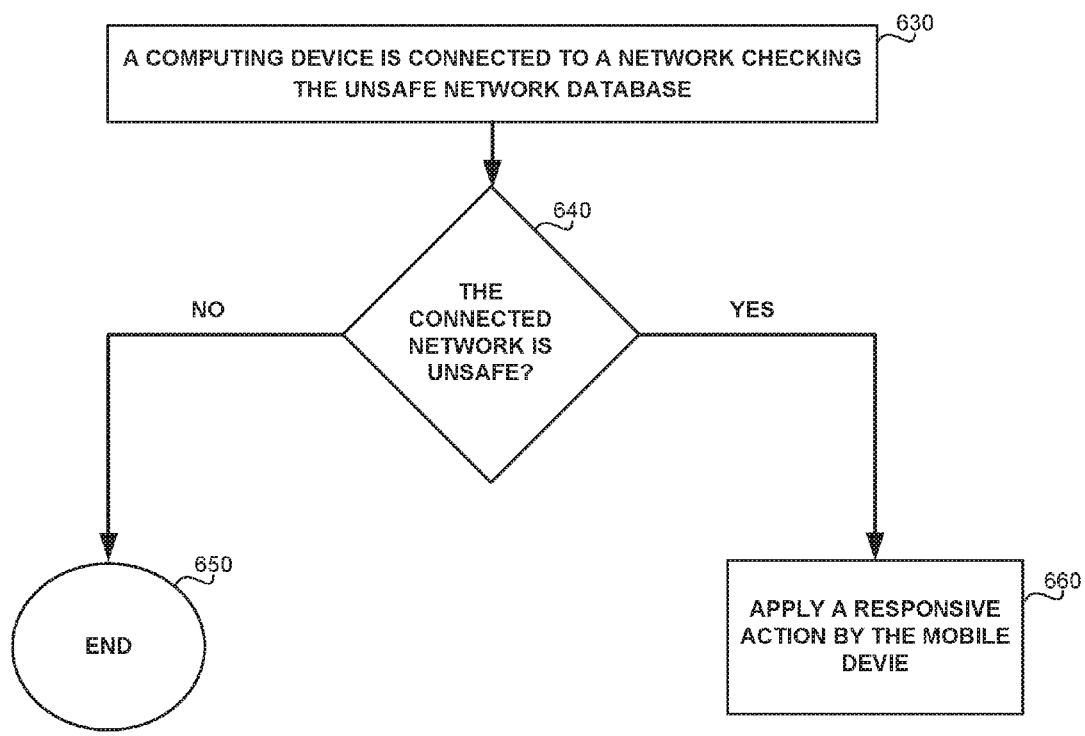

Referring now to FIGS. 6B showing a flowchart diagram of a method, in accordance with some exemplary embodiments of the disclosed subject matter.

In step 630, a computing device that is connected to a network may check whether the network is included in the unsafe network database. The computing device may check the unsafe network database to determine whether the network is potentially an unsafe network. In some exemplary embodiments, the check may be performed for a real-time detected threat in the network. Additionally or alternatively, the check may be performed for whether the historic information is indicative that the network is unsafe. Additionally or alternatively, the check may be performed with respect to attacks that are relevant to the computing device, such as based on the applications installed thereon or as defined by an IT department of an organization to which the computing device is associated. In some cases, the unsafe measurement which is acceptable for the computing device may be predetermined, such as by the IT department, by the user of the computing device, or the like.

In Step 640, the connected network may be determined to be safe or unsafe. If the network is determined to be safe, no action may be applied (Step 650). If the network is determined to be unsafe, Step 660 may be performed and a responsive action may be applied by the mobile device, such as in Step 240 of FIG. 2.

Figure 7A:
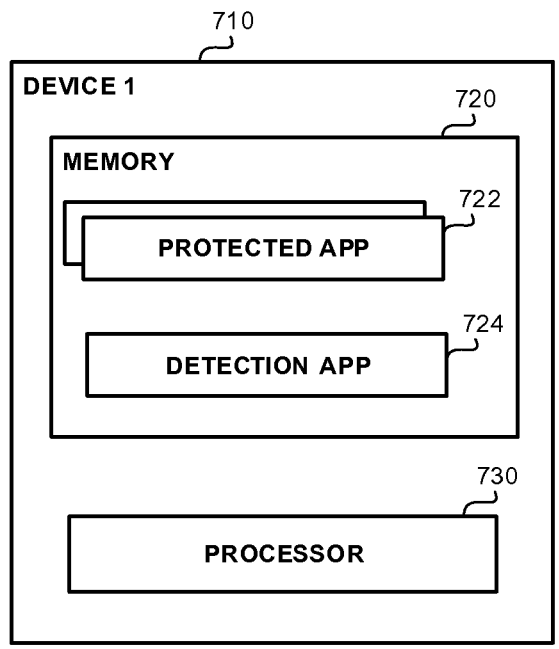
FIGS. 7A and 7B show illustrations of computing devices, in accordance with some exemplary embodiments of the disclosed subject matter.
Figure 7B:
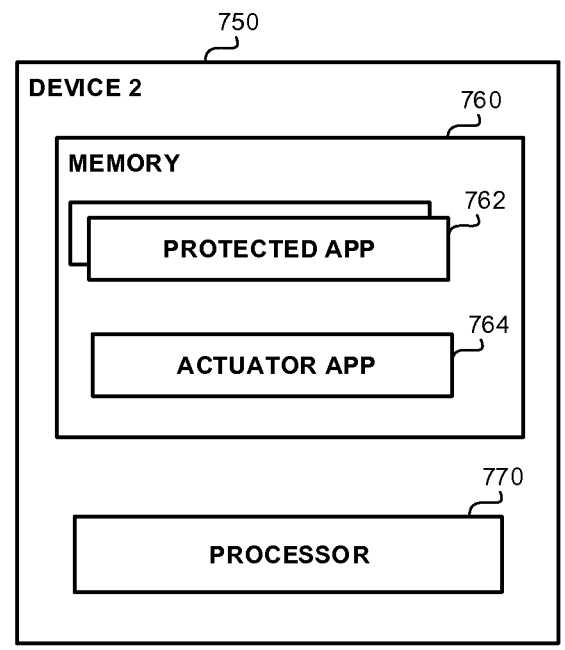

Referring now to FIGS. 7A and 7B showing illustrations of computing devices, in accordance with some exemplary embodiments of the disclosed subject matter. Device 710 and Device 750 may take part in methods in accordance with the disclosed subject matter, such as those depicted in FIGS. 2-5, 6A, and 6B.

In some exemplary embodiments, a Device 710 may be a computing device such as a mobile device, a smart phone, a PDA, a computer, a laptop, or the like. Device 710 may be connected to one or more computerized networks, such as Network 110 of FIG. 1.

In some exemplary embodiments, Device 710 may comprise a Processor 730. Processor 730 may be a Central Processing Unit (CPU), a microprocessor, an electronic circuit, an Integrated Circuit (IC) or the like. Processor 730 may be utilized to perform computations required by the Device 710 or any of it subcomponents.

In some exemplary embodiments, Device 710 may comprise a Memory 720 Memory 720 may be a hard disk drive, a Flash disk, a Random Access Memory (RAM), a memory chip, or the like. In some exemplary embodiments, Memory 720 may retain program code operative to cause Processor 730 to perform acts associated with any of the subcomponents of the Device 710.

In some exemplary embodiments, Device 710 may execute at least one Protected Application 722. Additionally or alternatively, Device 710 may execute a Detection Application 724. Protected Application 722 may be executed in a separate sandbox than Detection Application 724

In some exemplary embodiments, Detection Application 724 may be configured to generate dummy messages. In some exemplary embodiments, the dummy messages may be aimed at a server, such as Server 140 of FIG. 1. Detection Application 724 may transmit dummy messages based on pre-defined rules, which may be updated by a server, such as Server 150 of FIG. 150.

In some exemplary embodiments, Detection Application 724 may or may not be aware that Protected Application 722 is installed on Device 710 and/or that Protected Application 722 is currently being executed by Device 710. In some exemplary embodiments, Detection Application 724 may be configured to generate dummy messages relevant to attacks on Protected Application 722. Additionally or alternatively, Detection Application 724 may generate dummy messages without having knowledge of the existence of Protected Application 722 and/or it being executed, thereby potentially protecting Protected Application 722 without having explicit knowledge of it being a potential target to attacks.

In some exemplary embodiments, Protected Application 722 may be a popular application that is likely installed on Device 710, such as specific application or an application of a known type, such as an email client application, a browser application, or the like. Additionally or alternatively, Detection Application 724 may generate dummy messages that correspond to relatively standard protocols that are useful for a plurality of applications, such as, for example, SSL, HTML, or the like.

In some exemplary embodiments, the second server may update Detection Application 724 with security logic. The security logic may comprise information about requests that may be sent by Detection Application 724. Additionally or alternatively, the security logic may comprise verification logic that is useful for testing corresponding responses for changes that may suggest an existence of a potential attacker.

Referring now to Device 750 of FIG. 7B which may be connected to the same computerized network that Device 710 is connected to. The detection of a potential attack by Detection Application 724 may suggest that the computerized network is exposed to the potential attack and therefore Device 750 may also be exposed to similar security threats.

In some exemplary embodiments, Device 750 may execute an Actuator Application 764. Actuator Application 764 may be notified of the existence of the potential attacker detected by Detection Application 724, either directly by Detection Application 724, indirectly through a server, such as Server 160 of FIG. 1, or the like. In some exemplary embodiments, Actuator Application 764 may perform a responsive action to the potential attack detected by Detection Application 724, which may be similar to responsive actions which may be taken by Detection Application 724. In some exemplary embodiments, Actuator Application 764 may be a thin protection application when compared to Detection Application 724 and which does not detect threats on its own but only provides responsive actions to threats detected by other devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the processor being adapted to perform the steps of:
analyzing an activity, wherein the activity is performed in response to a message, wherein the message is transmitted by a first application that is executed by a computing device, wherein the computing device is connected to a computerized network, wherein the first application is configured to transmit the message in order to induce a potential attacker to perform a malicious activity, wherein said analyzing comprises comparing the activity to a predetermined expected activity in response to the message, wherein the message transmitted by the first application simulates network traffic of a second application, wherein the activity comprises a reply message that is transmitted in response to the message, wherein a content of the reply message is indicative to the potential attack; and determining, based on the analysis of the activity, that the second application is under a potential attack;

whereby an operation of the first application is capable of exposing potential attacks on the second application without monitoring network traffic of the second application.

2. The computerized apparatus of claim 1, wherein the computerized apparatus is the computing device, wherein the computing device executing the second application, wherein said method further comprising inducing a responsive action in the computing device in response to the determination that the second application is under potential attack.

3. A computerized apparatus having a processor, wherein the computerized apparatus is a server different than a computing device, the processor being adapted to perform the steps of:

analyzing an activity, wherein the activity is performed in response to a message, wherein the message is transmitted by a first application that is executed by the computing device, wherein the computing device is connected to a computerized network, wherein the first application is configured to transmit the message in order to induce a potential attacker to perform a malicious activity, wherein said analyzing comprises comparing the activity to a predetermined expected activity in response to the message, wherein the message comprises a trackable content, wherein the activity comprises an exploitation of the trackable content, wherein the trackable content comprises identifying information which identify the computing device, wherein the exploitation of the trackable content is indicative of the potential attacker exploiting the content of the message; and determining, based on the analysis of the activity, that a second application is under a potential attack, wherein said determining comprises retrieving the identifying information and identifying based on the identifying information the computerized device that is under the potential attack;

whereby an operation of the first application is capable of exposing potential attacks on the second application without monitoring network traffic of the second application.

4. The computerized apparatus of claim 3 further comprising inducing a responsive action in the computing device in response to the determination that the second application is under potential attack, wherein said inducing comprises:

notifying the computing device of the potential attack and the computing device performing the responsive action.

5. A computerized apparatus having a processor, the processor being adapted to perform the steps of:

analyzing an activity, wherein the activity is performed in response to a message, wherein the message is transmitted by a first application that is executed by a computing device, wherein the computing device is connected to a computerized network, wherein the first application is configured to transmit the message in order to induce a potential attacker to perform a malicious activity, wherein said analyzing comprises comparing the activity to a predetermined expected activity in response to the message;

determining, based on the analysis of the activity, that a second application is under a potential attack;

whereby an operation of the first application is capable of exposing potential attacks on the second application without monitoring network traffic of the second application; and updating an unsafe network database based on said determining to indicate that the computerized network is unsafe, wherein the unsafe network database is utilized by one or more computing devices to determine whether the one or more computing devices are connected to a potentially unsafe network.

6. A method comprising:

executing, by a computing device, a first application, wherein the computing device is capable of executing one or more additional applications, wherein said executing comprises:

transmitting, by the first application, a dummy message via a computerized network, wherein the dummy message simulates network traffic of the one or more additional applications;

receiving, by the first application, a reply message to the dummy message, wherein the reply message is received from the computerized network; and comparing the reply message with an expected reply message to the dummy message in order to identify a potential attack on the one or more additional applications.

7. The method of claim 6, wherein each of the first application and the one or more additional applications is being executed in a separate sandbox, whereby the first application is incapable of monitoring traffic to and from the one or more additional applications.

8. The method of claim 6, wherein the dummy message is characterized in at least one of the following characteristics:

the dummy message is configured to utilize a protocol that is used by at least one of the one or more additional applications;

the dummy message is configured to access a remote resource that is accessed by at least one of the one or more additional applications; and the dummy message comprising a user agent identification of at least one of the one or more additional applications.

9. The method of claim 6, wherein said comparing comprises comparing a certificate list returned in the reply message with an expected certificate list.

10. The method of claim 6 further comprises:

determining that the computerized network is exposed to a potential attack; and updating an unsafe network database to include the computerized network, wherein the unsafe network database is retained by a remote server.

11. The method of claim 10, wherein the remote server is configured to alert a second computing device of being exposed to the potential attack, wherein the second computing device is connected to the computerized network substantially at the same time that the computing device is connected to the computerized network.

12. The method of claim 6, wherein the computerized network is a public wireless network that provides access to the Internet.

13. The method of claim 6 further comprises in response to identifying the potential attack, applying a responsive action.

14. The method of claim 13, wherein the responsive action comprises outputting a notification to a user that is associated with the computing device.

15. The method of claim 13, wherein the responsive action comprises applying a protection mechanism on the computing device, wherein the protection mechanism is configured to protect at least one of the one or more additional applications from potential attacks that are similar to the potential attack.

16. The method of claim 6, wherein the computing device comprises a local repository that retains dummy messages and corresponding expected web pages to be received in reply to the dummy messages, wherein the reply message comprises a web page, wherein said comparing comprises comparing the web page with an expected web page which corresponds to the dummy message according to the local repository.

17. The method of claim 6,
wherein the computing device comprises a local repository that retains dummy messages and corresponding expected reply messages, wherein the local repository comprises a parameterized reply message,
wherein said comparing comprises comparing the reply message with the parameterized reply message to determine whether the reply message adheres to a template of a reply message defined by the parameterized reply message.

18. A computerized apparatus having a processor, the processor being adapted to perform the steps of:
detecting an exploitation of a trackable content, wherein the trackable content is comprised in a dummy message that is transmitted by an application, wherein the application is being executed by a computing device, wherein the dummy message is transmitted via a communication channel, wherein the application is configured to transmit dummy messages in order to induce a potential attacker to exploit trackable content in the dummy messages;
retrieving identifying information associated with the trackable content, wherein the identifying information comprises identification of the computing device and identification of the communication channel; and
determining that messages transmitted by the computing device via the communication channel are exposed to a potential attacker.

19. The computerized apparatus of claim 18, wherein the trackable content comprises log-in credentials, wherein the log-in credentials are uniquely associated with the application, wherein said detecting comprises detecting performing a log-in using the log-in credentials.

20. The computerized apparatus of claim 19, wherein the log-in credentials comprise a user identifier and a password, wherein the identifying information is encoded in the password.

21. The computerized apparatus of claim 18, wherein the trackable content comprises a web cookie which comprises the identifying information, wherein said detecting comprises receiving one or more messages which comprise the web cookie, wherein the one or more messages are determined not to be dummy messages.

22. The computerized apparatus of claim 18, wherein the processor is further adapted to perform:
detecting that the exploitation of the trackable content is performed within a predetermined time range from the transmission of the dummy message; and
in response to said detecting that the exploitation of the trackable content is performed within the predetermined time range, notifying the computing device to take a responsive action to a potential attack.

23. The computerized apparatus of claim 18, wherein the processor is adapted to perform in response to said determining:
determining that the communication channel is exposed to a potential attack; and
updating an unsafe network database to include the communication channel, wherein the unsafe network database is retained by a server, wherein one or more additional computing devices are configured to utilize the unsafe network database to detect whether the one or more additional computing devices are connected to a potentially unsafe communication channel.

24. The computerized apparatus of claim 18,
wherein the dummy messages are configured to perform one or more alternative activities which exploit the trackable content; and
wherein said detecting comprises detecting an activity that is different than the one or more alternative activities, wherein the activity exploits the trackable content.

25. A server having a processor, the server being connected to a network, the processor being adapted to perform the steps of:
receiving a message, wherein a computing device is connected to the network, wherein the computing device is executing a first application and is capable of executing one or more additional applications, wherein the first application is configured to transmit dummy messages to the server via the network, wherein the dummy messages simulate network traffic of the one or more additional applications, wherein the dummy messages comprise identifying information that identify the computing device;
determining that the message is an alteration of a dummy message;
extracting from the message the identifying information; and
outputting a notification of a potential attack to the computing device, wherein the computing device is configured to perform a responsive action in response to the notification.

26. A server having a processor, the server being connected to a network, the processor being adapted to perform the steps of comprising:
receiving a report, wherein the report is indicative of a potential attack in a network that is detected based on a dummy message transmitted by a mobile device, wherein the dummy message is transmitted by a first application executed by the mobile device, wherein the dummy message simulates network traffic of a second application; and
alerting a second mobile device that is connected to the network or is about to be connected thereto, that the network is deemed as unsafe.

27. The server of claim 26, wherein the processor is further configured to perform:
updating an unsafe network database to include the network.

28. The server of claim 27, wherein the processor is further configured to perform:
receiving a query from the second mobile device to the unsafe network database about the network; and
wherein said alerting is performed in response to a determination that the unsafe network database retains a record indicating the network is unsafe.

29. The server of claim 28, wherein said alerting is performed only if the second mobile device is deemed as exposed to the potential attack that was detected in the network.

30. The server of claim 27, wherein the processor is further configured to perform:

receiving a plurality of reports indicative of potential attacks in networks, wherein the plurality of reports are based on dummy messages transmitted by mobile devices when connected to the networks, whereby the unsafe network database reflects crowd-sourced information about potential threats in the networks.

* * * * *